(12) United States Patent
Holma

(10) Patent No.: US 7,778,272 B2
(45) Date of Patent: *Aug. 17, 2010

(54) METHOD FOR A MOBILE STATION TO SELECT AN UPLINK CODING MODE

(75) Inventor: Harri Holma, Espoo (FI)

(73) Assignee: Nokia Corporation, Espoo (FI)

( * ) Notice: Subject to any disclaimer, the term of this patent is extended or adjusted under 35 U.S.C. 154(b) by 1300 days.

This patent is subject to a terminal disclaimer.

(21) Appl. No.: 11/004,204

(22) Filed: Dec. 3, 2004

(65) Prior Publication Data

US 2005/0099961 A1    May 12, 2005

Related U.S. Application Data

(63) Continuation of application No. 09/609,880, filed on Jul. 5, 2000, now Pat. No. 6,868,257.

(30) Foreign Application Priority Data

Jul. 5, 1999    (FI) .................................. 991536

(51) Int. Cl.
H04J 3/16    (2006.01)
H04J 3/22    (2006.01)

(52) U.S. Cl. ................. 370/465; 370/342; 370/441; 455/63.1; 455/67.11; 455/422.1

(58) Field of Classification Search ............. None
See application file for complete search history.

(56) References Cited

U.S. PATENT DOCUMENTS

| | | | |
|---|---|---|---|
| 5,818,871 A | 10/1998 | Blakeney, II et al. | |
| 5,974,106 A | 10/1999 | Dupont et al. | |
| 6,134,220 A * | 10/2000 | Le Strat et al. | 370/252 |
| 6,181,686 B1 | 1/2001 | Hamalainen et al. | |
| 6,256,487 B1 | 7/2001 | Bruhn | |
| 6,389,066 B1 * | 5/2002 | Ejzak | 375/224 |
| 6,421,527 B1 * | 7/2002 | DeMartin et al. | 455/67.13 |
| 6,484,138 B2 * | 11/2002 | DeJaco | 704/221 |
| 6,484,145 B1 * | 11/2002 | Horne et al. | 705/8 |
| 6,529,730 B1 * | 3/2003 | Komaili et al. | 455/452.2 |
| 6,687,226 B1 * | 2/2004 | Galyas | 370/231 |
| 6,868,257 B1 * | 3/2005 | Holma | 455/63.1 |
| 7,500,018 B2 * | 3/2009 | Hakansson et al. | 709/246 |

FOREIGN PATENT DOCUMENTS

JP    06 104829    4/1994

(Continued)

OTHER PUBLICATIONS

Translation of Notification of Reason for Rejection (in the original Japanese), Japanese Patent Office, dated Aug. 29, 2003, for Japanese Patent application 2001-508178, which corresponds to the application in this case.

*Primary Examiner*—Michael J Moore, Jr.

(74) *Attorney, Agent, or Firm*—Banner & Witcoff, Ltd.

(57) ABSTRACT

Although the AMR coding mode control in a cellular telecommunication system is mainly centrally performed, preferably controlled by the RNC, and based on the system load quality measurements, such as, e.g., FER measurements, the MS is nevertheless allowed to change the AMR mode in certain situations.

10 Claims, 3 Drawing Sheets

FOREIGN PATENT DOCUMENTS

| | | |
|---|---|---|
| JP | 06 268606 | 9/1994 |
| JP | 07 283 758 | 10/1995 |
| JP | 07 283888 | 10/1995 |
| JP | 11 220437 | 8/1999 |
| JP | 2000 69556 | 3/2000 |
| JP | 2000 217144 | 8/2000 |

* cited by examiner

METHOD FOR A MOBILE STATION TO SELECT AN UPLINK CODING MODE

CROSS-REFERENCE TO RELATED APPLICATIONS

The present application is a continuation of U.S. patent application Ser. No. 09/609,880, filed on Jul. 5, 2000, now U.S. Pat. No. 6,868,257, which claimed priority under 35 U.S.C. §119 from Finnish Pat. App. Ser. No. 991536, which was filed on Jul. 5, 1999. Priority is claimed under 35 U.S.C. §120 from the aforesaid U.S. patent application Ser. No. 09/609,880 and under 35 U.S.C. §119 from the aforesaid Finnish Pat. App. Ser. No. 991536, and both applications are incorporated by reference in their entirety.

BACKGROUND OF THE INVENTION

1. Field of the Invention

The invention is related to coding mode control in cellular telecommunication systems. Particularly, the invention is directed to a method for selection of the coding mode for a multi rate connection between a mobile station and a digital cellular telecommunication network.

2. Description of the Related Art

The following list defines some of the abbreviations used in this specification:

| | |
|---|---|
| AC | admission control |
| AMR | adaptive multi rate |
| BS | base station |
| BTS | base transceiver station |
| CDMA | code division multiple access |
| C/I | carrier to interference ratio |
| FER | frame error rate |
| GSM | general system for mobile communications |
| LC | load control |
| MAC | medium access control |
| RM | radio resource manager |
| RRC | radio resource control |
| RRM | radio resource management |
| RNC | radio network controller |
| SHO | soft handover |
| TC | transcoder |
| TF | transport format |
| TFC | transport format combination |
| TFCI | transport format combination identifier |
| TFCS | transport format combination set |
| UE | user equipment |
| UMTS | universal mobile telecommunication system |
| UTRAN | UMTS terrestrial radio access network |
| WCDMA | wideband CDMA |

The AMR concept provides a multi rate capability for connections between a mobile station (MS, also referred to as 'user equipment'—UE) and a network. The AMR speech codec has 8 different bit rates (from 4.75 kbps to 12.2 kbps) for speech coding. A higher bit rate provides better speech quality but gives lower capacity and coverage. In GSM, the AMR control is a link level control function, controlled by the BTS and based on C/I measurements. In GSM, the codec mode control is in the BTS. For control of downlink direction, the mobile station (MS) reports observed C/I to the BTS. For control of uplink direction, the BTS measures C/I.

The present specifications of the WCDMA system leave room for improvement of the usage of the AMR concept because they do not describe adequate methods to optimize transmission control with the AMR concept. Thus, there is a need for methods of optimizing transmission control when using AMR connections.

SUMMARY OF THE INVENTION

One object of the invention is to provide a method which avoids the problems of the prior art.

Another object of the present invention is to provide a method for optimizing transmission control in systems using AMR.

These and other objects are reached by arranging a network element of the cellular network to control the AMR modes of more than one mobile station together, and to adjust AMR modes in overload situations or when the system is close to overload in uplink or downlink directions.

The method according to a preferred embodiment of the present invention includes the step of determining, by the mobile station, a new uplink coding mode when the mobile station determines that a reduction in transmit power of the mobile station is optimal for the mobile station.

In a preferred embodiment of the present invention, the AMR control is mostly centrally performed, preferably controlled by the RNC and based on the system load or quality measurements, such as, e.g., FER measurements. However, the MS is allowed to change the AMR mode in certain situations.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

A. General Considerations

Figure 1:
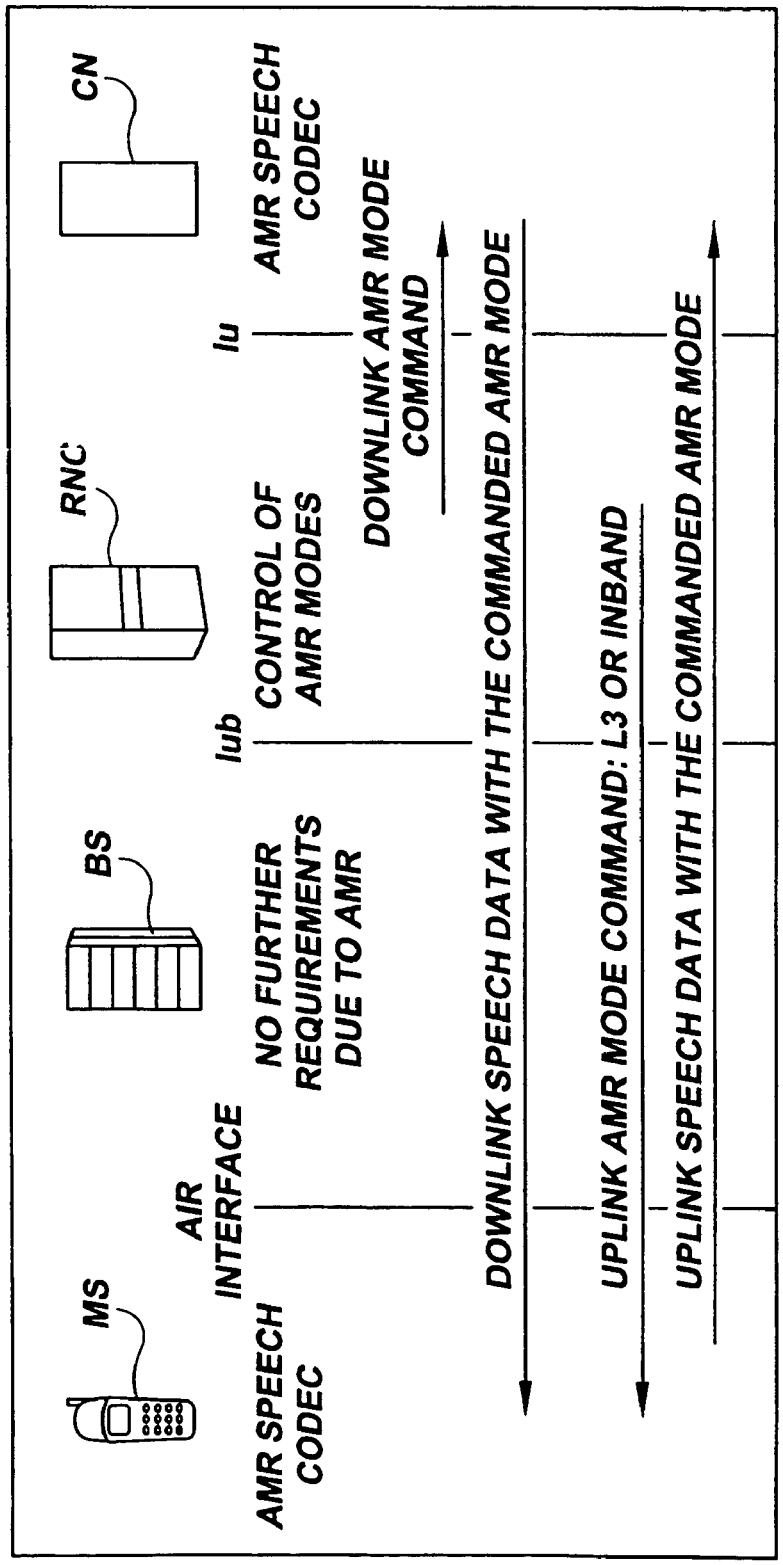
FIG. 1 illustrates AMR mode control according to a preferred embodiment of the present invention.
Figure 2:
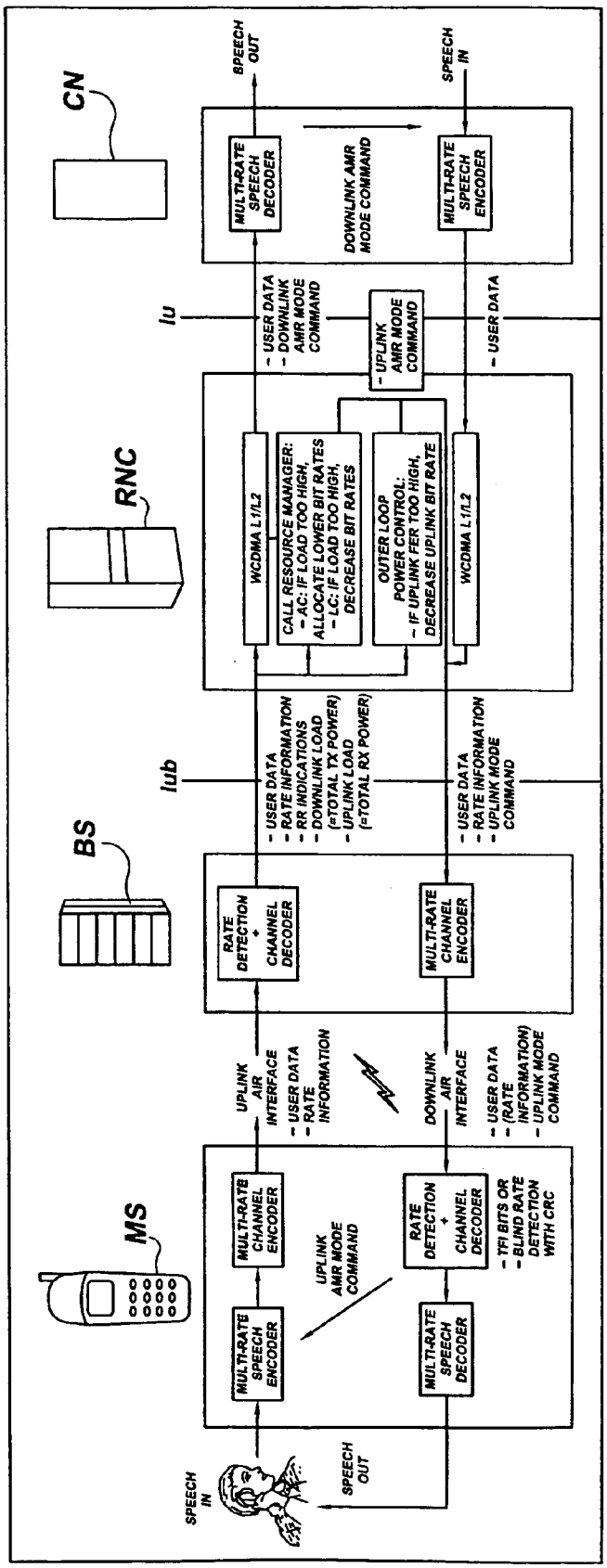
FIG. 2 illustrates in a more detailed way AMR mode control according to a preferred embodiment of the present invention.

Referring to FIGS. 1 and 2, the AMR mode control according to a preferred embodiment of the present invention is mostly centrally performed, although the mobile station is preferably allowed to adjust the AMR mode in certain situations. The AMR modes can be changed in the following exemplary ways:

If the load gets too high, the AMR bit rates of the existing speech connection can be lowered.

If the load gets too high, the AMR bit rates of the new starting speech connections can be set to lower values.

The load measurement that is used in the AMR adaptation decision can be the load of a single cell, but the load of the adjacent cells can also be taken into account.

If the uplink quality deteriorates (e.g. too high FER), the uplink AMR mode can be lowered.

Preferably, the RNC is the network element that controls these changes of the AMR modes. The default AMR bit rate can be set by the operator on a cell basis. The uplink and downlink AMR modes and their control can be completely independent. In the current specifications of the WCDMA system, the transcoder (TC) is located in the core network.

As shown in FIG. 1, control of AMR modes according to a preferred embodiment of the present invention is preferably located in the controlling RNC. The RNC controls the downlink AMR mode by sending AMR mode control commands to the transcoder unit in the core network, and controls the uplink AMR mode by sending AMR mode control commands to the mobile station.

As shown in FIG. 2, the coding mode control according to a preferred embodiment of the present invention can be through outer loop power control and/or the cell resource manager within the RNC, i.e., in admission control and/or load control functions. Preferably, coding mode control is realized within radio resource management (RRM) functions. The AMR mode adaptation can be asymmetric, i.e., different AMR modes can be used in uplink and downlink during a single connection.

Preferably, the load situation is the basis for AMR mode control: for downlink, the BS reports total BS transmission power, and for uplink, the BS measures total interference power at the BS. The RNC performs AMR mode control based on this information. The Uplink FER can also be used in AMR mode control.

B. An Example of a Control Algorithm

In this section, a specific example of a control algorithm is described. According to this algorithm, the AMR mode is set by the admission control function in the RNC. This section only describes one specific example, and does not limit other embodiments of the invention in any way.

The cell RM can detect when the system load is getting close to the admission control blocking threshold. In that case, the admission control allocates lower bit rates to the new AMR users to provide a higher capacity. This algorithm preferably works on a cell basis. In this embodiment, the AMR mode is not modified during the connection due to load considerations. Adaptation of the algorithm according to this embodiment is rather slow, and in practice it takes several minutes after the cell load has increased over a limit before most of the AMR connections have lower bit rates. This adaptation speed depends on the average length of the speech connections. Therefore, this method can be considered to form an automatic detection of busy hours on a cell basis. An exemplary algorithm according to this admission control example could be as follows:

Step (1)   If (Estimated_blocking> 'AMR_blocking_limit'):
           decrease the AMR bit rate of all incoming AMR users by
             'AMR_step' number of AMR modes in that transmission
             direction, and
           go to step (4)
Step (2)   If (Estimated_blocking =0):
           increase the AMR bit rate of all incoming AMR users by
             'AMR_step'
             number of AMR modes in that transmission direction,
             and
           go to step (4)
Step (3)   If no actions in steps (1) or in (2):
           go to step (5)
Step (4)   Wait until 'AMR_change_percentage' % of the speech
           connections in the cell are using the new AMR mode before
           proceeding to step (5)
Step (5)   Calculate Estimated_blocking:
             estimate for each Reverse Rate Indicator (RRI) channel if a
             new AMR -continued user would be blocked or not. We can assume here simply
           that the user would be blocked if $P_{rx,NC} > P_{rx,target}$ (=no
           power increase estimation). For AMR users the power
           increase is quite small in any case.
           average for 'AMR_average' seconds the blocking
           probability (e.g., 30s) calculate
             Estimated_blocking = estimated_blocked_RRIs/
             total_number_RRIs
Step (6)   Go back to step (1)

This procedure is preferably separate for uplink and downlink. Therefore, it is possible that downlink connections use lower AMR modes than uplink connections if the load in the downlink direction increases near overload before that happens in the uplink direction.

The parameters in the previous example are as follows:

TABLE 1

| Parameter | Description | Example Values |
|---|---|---|
| AMR_blocking_limit | The maximum estimated blocking percentage before AC allocates lower AMR modes | 2% |
| AMR_change_percentage | AC waits until this percentage of the AMR users in that cell are using the new AMR mode before further actions | 50% |
| AMR_average | The averaging period in estimating the blocking percentage | 30 s |
| AMR_step | The number of AMR mode steps that AC adjusts at one time | 1 AMR mode |

C. A Further Example of a Control Algorithm

In this section, another specific example of a control algorithm is described. According to this algorithm, the AMR mode can also be changed by the load control function in the RNC. This section only lists a specific example, and does not limit other embodiments of the invention in any way.

In this embodiment the admission control estimates how much the total load could be decreased if all AMR users change to their lowest bit rate. In other words, instead of blocking a new user, the admission control assumes that the existing AMR users can lower their bit rate, and thus admit a higher number of users in the system. A new user is admitted by the uplink admission control if $$P_{rx,NC} + \Delta P_{rx,new} < P_{rx,target} \qquad (1)$$

where $P_{rx,NC}$ is the non-controllable load.

The non-controllable load consists of the interference from:

intra-cell real time users, intra-cell non-real time users with their guaranteed minimum bit rate, and inter-cell users.

The non-controllable load cannot be affected by the packet scheduler of this particular cell. Note that only the minimum bit rate of AMR is assumed to be non-controllable.

$$\Delta P_{rx,new} = \frac{\Delta L}{1 - (\eta - L_{NRT} - L_{AMR}) - \Delta L} P_{rx,tot} \quad (2)$$

where
$\Delta L$=load increase from the new user,
$L_{NRT}$=load from best effort packet users (obtained from the packet scheduler in RNC), and
$L_{AMR}$=the maximum decrease in the load from AMR users if their bit rate is decreased to the minimum.

The term $L_{AMR}$ reflects the flexibility of bit rates of AMR users. The current bit rates of AMR uses are preferably kept in a table in the cell resource manager.

$$L_{AMR} = \sum_{i=1}^{N} \left( \frac{1}{1 + \frac{W}{\rho_{i,used} * R_{i,used}}} - \frac{1}{1 + \frac{W}{\rho_{i,minimum} * R_{i,minimum}}} \right) \quad (3)$$

where
$\rho_{i,used}$=$E_b/N_o$ for the used AMR bit rate,
$\rho_{i,minimum}$=$E_b/N_o$ for the minimum AMR bit rate,
$R_{i,used}$=the used AMR bit rate, and
$R_{i,minimum}$=the minimum AMR bit rate='AMR_min_mode'.

In order to implement this modified admission control we need to
obtain the current bit rates of AMR users (=$R_{i,used}$)
obtain the minimum allowed bit rates of AMR users (=$R_{i,minimum}$='AMR_min_mode'), and
calculate $L_{AMR}$ In downlink admission control, similar principles can be applied as in uplink.

If the admission control assumes that the AMR bit rates can be lowered, that option must be then supported by the load control. In the load control it is quite simple to decrease the AMR bit rate in case of overload. However, it is difficult to decide when the AMR bit rate can be increased in case of SHO. In SHO the load control should check the loading in all SHO branches before increasing the AMR bit rate. That requires that there is signalling between the cell RMs of neighboring cells. This signalling causes additional load to the RNC, and is therefore not desirable.

One simplified approach here is that the load control would only decrease the AMR bit rates but never increase them back during the connection. This approach would not need the signalling between cell RMs of SHO branches.

In another simplified version each AMR connection is kept in a list only in one cell's RM. That would make it easier to handle SHO users. The load control algorithm could then only affect the AMR mode of those users who are listed in that cell. Other AMR users are seen as non-controllable traffic from this cell's point of view. Also, the admission control could then take only those AMR users into account that can be controlled by that cell. If we assume that soft handover overhead is 30%, then in this simplified approach, we could modify the AMR mode of 1/1.3=77% of users in each cell. The rest of AMR users (23%) would then be as non-controllable users.

It is assumed here that the cell resource manager in RNC keeps a list of the bit rates of the AMR users in that particular cell. That list can be used in the admission control and in the load control algorithms.

Figure 3:
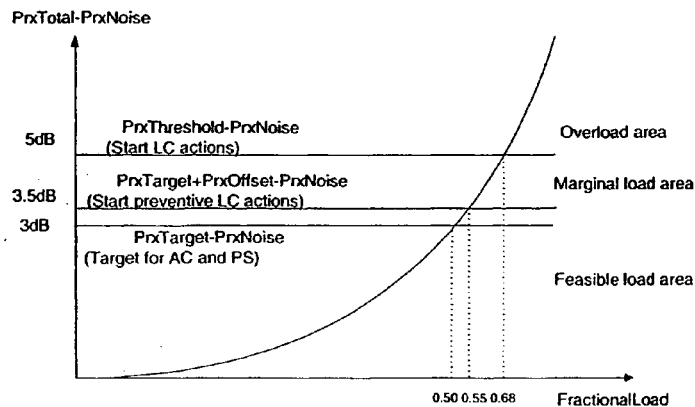
FIG. 3 illustrates load thresholds in a preferred embodiment of the present invention.

The uplink load control thresholds are shown in FIG. 3. For real-time services, the preferred actions when the system is in overload are as follows:

In the uplink direction:
$P_{rx,Total} > P_{rx,Target} + P_{rx,Offset}$: freeze the outer loop setpoint
$P_{rx,Total} > P_{rx,Threshold}$: lower the outer loop setpoint, start controlled dropping In the downlink direction:
$P_{tx,Total} > P_{tx,Target} + P_{tx,Offset}$: no actions
$P_{tx,Total} > P_{tx,Threshold}$: start controlled dropping When multi rate connections are used, the highest bit rates can be used when there is no overload. In case of overload, the load control actions can be as follows:

In the uplink direction:
$P_{rx,NC} > P_{rx,Target} + P_{rx,Offset}$: lower AMR bit rates
$P_{rx,NC} < P_{rx,Target}$: increase AMR bit rates In the downlink direction:
$P_{tx,NC} > P_{tx,Target} + P_{tx,Offset}$: no actions
$P_{tx,NC} < P_{tx,Target}$: start controlled dropping where $P_{rx,NC}$ and $P_{tx,NC}$ are the non-controllable loads.

The idea is to lower the AMR bit rates before ending up in an overload state. The margin between $P_{rx,Target} + P_{rx,Offset}$ and $P_{rx,Target}$ is a hysteresis that is needed to prevent unnecessary jumping between the modes.

The AMR bit rates are first decreased from speech users:
in uplink, who have the highest load factor, and
in downlink, who have the highest transmission power per connection.

These speech users are the ones who are causing the highest interference.

D. A Further Example of a Control Algorithm

In this section, another specific example of a control algorithm is described. According to this algorithm, the AMR mode can also be changed by the outer loop load control function in the RNC. This section only describes a specific example, and does not limit other embodiments of the invention in any way.

It is possible that some links experience bad quality due to coverage reasons even if the system is not in overload. One possibility is to let the mobile station change its uplink mode without any network commands if it is running out of power. This would require standardization among manufacturers. If this feature is in all mobiles, then the coverage extension by AMR would be available in all manufacturers' WCDMA networks and it cannot be used as a differentiating factor.

Figure 4:
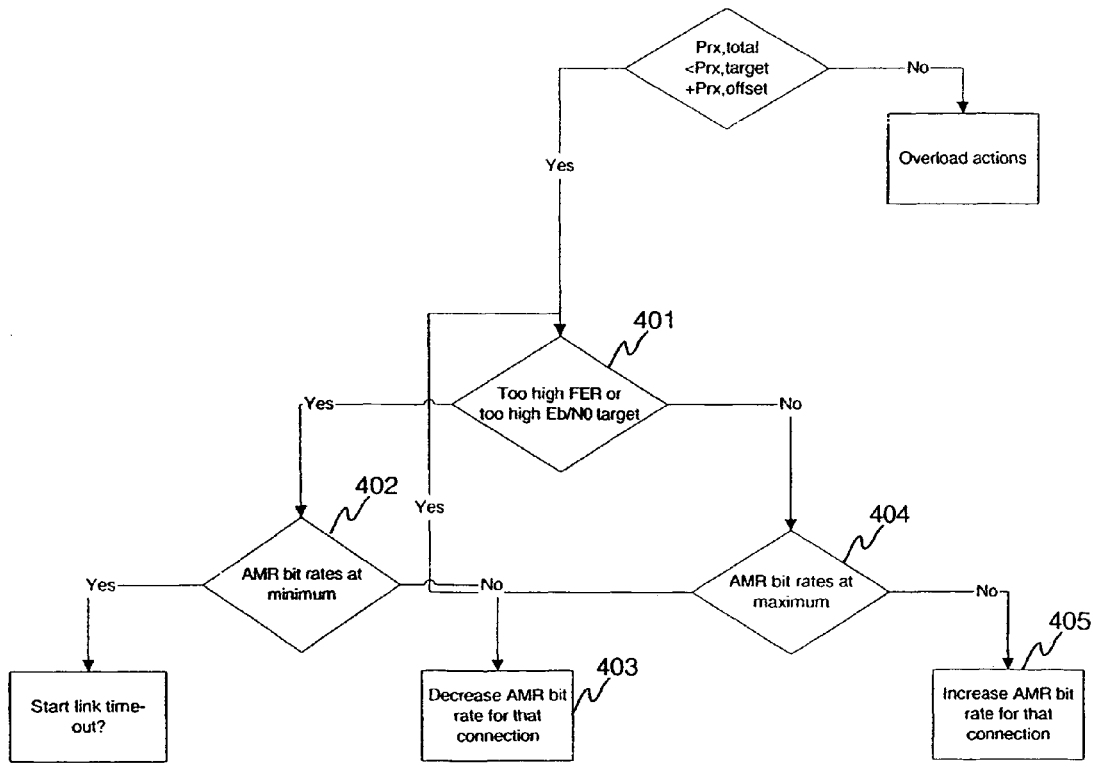
FIG. 4 illustrates a further preferred embodiment of the present invention.

If it is required that the network always decides the uplink AMR mode, the uplink outer power loop control is needed to ask to lower the AMR bit rate to improve the uplink coverage. The actions of the outer loop power control are shown in FIG. 4. Note that the uplink connection always gets the required FER if there is enough power in the mobile station to follow the power control commands and there is no overload in uplink.

As shown in FIG. 4, the outer loop power control algorithm could be, for example, as follows:

| | |
|---|---|
| Step (1) | Calculate the average FER over the period of 'AMR_FER_averaging_length' |
| Step (2) | If it is found in step 401 that the average FER > 'AMR_FER_max_uplink' and in step 402 that the current mode > 'AMR_min_mode': <br>    decrease AMR mode for uplink at Step 403 by <br>    'AMR_step' number <br>    of AMR modes <br> If it is found in step 401 that the average FER < 'AMR_FER_acceptable' and in step 404 the current AMR mode < 12.2 kbps: <br>    increase AMR mode for uplink at step 405 by "AMR_step" <br>    number of <br>    AMR modes <br> A quick reaction is obtained if AMR mode is lowered immediately, if more than 'AMR_FER-max_uplink' * 'AMR_FER_averaging_length' errors are received in less than 'AMR_FER_averaging_length'. For example, with values of 3% and 5s (and 50 frames per second), if more than 7.5 (=0.03*50*5) errors are received in less than 5 s, a lower AMR mode is used. This makes it possible to react quickly to bad quality in an error burst due to coverage. |
| Step (3) | Go to Step (1) |

Note that the outer loop PC must keep a list of the current AMR bit rates of those connections that it is controlling.

The parameters of the previous example are the following:

TABLE 2

| Parameter | Description | Example Values |
|---|---|---|
| AMR_FER_averaging_length_uplink | The averaging length for calculating the uplink FER | 5 s |
| AMR_FER_max_uplink | If the uplink FER exceeds this value, the mobile is commanded to a lower AMR mode | 3% |
| AMR_FER_acceptable_uplink | If the uplink FER is lower than this value, the mobile is commanded to a higher AMR mode | 1.5 ... 2 × outer loop FER target, e.g., 1.5% |
| AMR-step | The number of AMR modes that are adjusted at one time | 2 AMR modes (= 12.2 → 7.95 → 6.7 → 5.15) |

The values for the parameters need to be optimized depending on the MOS (Mean Opinion Score) vs. FER behavior of the AMR speech codec. That optimization depends, e.g., on the chosen unequal error protection on L1. The operator must also set the maximum power per downlink speech connection so that it supports the range extension provided by the uplink AMR adaptation.

E. Signaling of the AMR Mode Command

Signalling of the AMR mode command can be performed in various ways, inband as well as outband. Some ways of signalling the AMR mode according to certain advantageous embodiments of the invention are described in the following.

In a further advantageous embodiment of the invention, inband signaling is used for the AMR mode control. In this embodiment, information about the new AMR mode to be used is sent to the encoder along with user data.

Coupling of an AMR mode control message into user data can be performed preferably in the MAC layer.

Inband signaling has certain advantages. For example, no separate signalling procedure needs to be created between the RRC functions in the RNC and the transcoder. Further, inband signaling provides a quick way to change the AMR mode. Inband signaling is also supported in the present GSM system.

If outband signaling is used, the AMR mode command is sent in a separate signalling message. The signaling can be effected for example using the RRC layer. The use of the RRC layer for the adaptation of downlink AMR mode requires new signalling procedures between the RNC and the transcoder in the core network. Existing signalling procedures can be used for uplink AMR mode control. One example of a procedure that can be used for uplink AMR mode control is the TRANSPORT CHANNEL RECONFIGURATION procedure.

Outband signaling has certain advantages. For example, when outband signalling is used, no AMR mode command generation is needed on the MAC layer. Further, transmission of signaling information on the user plane increases complexity, since user plane is meant to be used for user data only. For the uplink direction, already defined RRC procedures can be used.

F. Further Class of Advantageous Embodiments

In a further class of advantageous embodiments of the invention, the MS is allowed to control the AMR mode in certain situations. For example, it is advantageous if MS is able to change the AMR mode when the conditions on the air interface have changed and an AMR mode change needs to be performed quickly to save proper quality on a speech connection.

In one advantageous embodiment, the MS is allowed to change uplink AMR mode if the maximum transmission power level of the MS is reached. Since the MS cannot increase the transmission power any more, the MS can maintain the quality of a speech connection in deteriorating radio interface conditions by changing to an AMR mode, which provides a lower speech data rate. Preferably, the MS is not required to request a mode change from the RNC.

Preferably, the set of AMR modes the MS is allowed to change to consists of those AMR modes which are represented in the transport formats of the currently valid transport format set.

Since the transport format set is decided by the network and specified to the MS by the network, the network can set the limits for the selection of the applicable AMR modes. The network discovers the AMR mode used by the MS from rate information, which is sent by the MS along with the user data.

A transport format (TF) is a set of parameters, which correspond to a single way of preparing a payload data stream for transmission over the air interface. The set of parameters indicate for example payload data rate, the error control coding method used, interleaving method used, and other processing methods used in the particular cellular telecommunications network, i.e. describe the physical layer processing applied to the data to be transmitted. Consequently, each TF corresponds to a specific instantaneous bearer bit rate. Further, each bearer has at least one transport format. In the case of a bearer supporting for example multiple bit rates, a bearer can have more than one corresponding TF.

Each transport format has a corresponding transport format identifier (TFID). The TFIDs can be assigned to TFs in many ways, for example, in ascending order starting from the lowest bit rate, or according to some other predefined rule.

The combination of transport formats of the active bearers is a Transport Format Combination (TFC). The set of all possible transport format combinations form a Transport Format Combination Set (TFCS). Each TFC has a corresponding transport format combination identifier (TFCI), i.e., each TFCI corresponds to a definite group of transport formats. The TFCI is used to inform the current combination of transport formats to the receiver.

The mechanism in which the MS changes the AMR mode can advantageously be used to extend the coverage area of a speech connection. If the MS cannot increase transmission power any more, it can change the AMR mode to a mode which provides a lower data rate, thereby maintaining the quality of the speech connection even if the MS moves further away from the base station.

In an advantageous embodiment of the invention a method for selection of the coding method for a multi rate connection between a MS and a network in a digital cellular telecommunication system is provided. According to this embodiment, in certain circumstances the MS selects the coding method, and in other circumstances the network selects the coding method. Preferably, the selection of the coding method in the network is performed by radio network controller. Preferably, the MS selects the coding method, if the MS uses its maximum transmission power.

In a further advantageous embodiment of the invention a method for increasing the apparent radius of a cell as observed by an MS having a multi rate connection to a cellular network is provided. According to this embodiment, the coding method used for a connection of the MS is controlled on the basis of transmission power of the MS and the load of at least one cell. Preferably, the coding method used by the MS is changed, if the quality of the radio interface deteriorates and the MS uses its maximum transmission power. Preferably, the MS selects the coding method.

G. Further Considerations

In a further advantageous embodiment of the invention, change of AMR mode is coupled with changing of the transport format.

The invention allows the increase of connection coverage area, as well as capacity and quality of connections.

The name of a given functional entity, such as the radio network controller, is often different in the context of different cellular telecommunication systems. For example, in the GSM system the functional entity corresponding to a radio network controller (RNC) is the base station controller (BSC). Therefore, the term radio network controller in the claims is intended to cover all corresponding functional entities regardless of the term used for the entity in the particular cellular telecommunication system. Further, the various message names such as the AMR MODE COMMAND message name are intended to be examples only, and the invention is not limited to using the message names recited in this specification.

The present invention can be utilized in many different cellular networks such as the third generation cellular network presently under development. For example, the invention can be utilized in the WCDMA system.

In view of the foregoing description it will be evident to a person skilled in the art that various modifications may be made within the scope of the invention. While a preferred embodiment of the invention has been described in detail, it should be apparent that many modifications and variations thereto are possible, all of which fall within the true spirit and scope of the invention.

The invention is not limited by the embodiments described above which are presented as examples only but can be modified in various ways within the scope of protection defined by the appended patent claims.

What is claimed is:

1. A method comprising:
   determining, by a communication network, new coding modes for a multi rate connection between a mobile station and the communication network, wherein said new coding modes are determined in a central fashion independently from inputs from the mobile station, and wherein said determining comprises using an admission control function in a network element to determine at least a portion of the new coding modes, and
   wherein using the admission control function in a network element to determine at least a portion of the new coding modes comprises:
      estimating a blocking percentage at a current level of load, and lowering a default adaptive multi-rate (AMR) mode for new bearers, if the estimated blocking percentage is higher than a predefined limit.

2. The method of claim 1, wherein determining, by the communication network, the new coding modes comprises using a load control function in the network element to determine at least a portion of the new coding modes.

3. The method of claim 2, further comprising:
   decreasing bit rates of existing bearers using the load control function in the network element to create room for a new bearer.

4. The method of claim 1, wherein determining, by the communication network, the new coding modes comprises using an outer loop load control function in the network element to determine at least a portion of the new coding modes.

5. An apparatus comprising:
   a network element configured to determine new coding modes for a multi rate connection between a mobile station and a cellular telecommunications network, wherein said new coding modes are determined in a central fashion independently from inputs from the mobile station, and wherein said determining comprises using an admission control function in the network element to determine at least a portion of the new coding modes, and
   wherein using the admission control function in the network element to determine at least a portion of the new coding modes comprises:
      estimating a blocking percentage at a current level of load, and lowering a default adaptive multi-rate (AMR) mode for new bearers, if the estimated blocking percentage is higher than a predefined limit.

6. The apparatus of claim 5, wherein determining the new coding modes comprises using a load control function in the network element to determine at least a portion of the new coding modes.

7. The apparatus of claim 6, wherein the apparatus is further configured to:
decrease bit rates of existing bearers using the load control function in the network element to create room for a new bearer.

8. The apparatus of claim 5, wherein determining the new coding modes comprises using an outer loop load control function in the network element to determine at least a portion of the new coding modes.

9. The apparatus of claim 5, wherein the network element comprises a radio network controller.

10. The method of claim 1, wherein the network element comprises a radio network controller.

* * * * *